(12) United States Patent
Ten-Jet-Foei et al.

(10) Patent No.: US 11,286,701 B2
(45) Date of Patent: Mar. 29, 2022

(54) DEVICE FOR DETECTING AN IMPACT FORCE AND A METHOD OF MANUFACTURING THEREOF

(71) Applicant: Inalfa Roof Systems Group B.V., Oostrum (NL)

(72) Inventors: Suyanto Teri Wahiyu Ten-Jet-Foei, Helmond (NL); Theodorus Van Doleweerd, Budel-Dorplein (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 96 days.

(21) Appl. No.: 16/683,743

(22) Filed: Nov. 14, 2019

(65) Prior Publication Data
US 2020/0157871 A1    May 21, 2020

(30) Foreign Application Priority Data

Nov. 15, 2018  (EP) ..................................... 18206421

(51) Int. Cl.
*B60J 7/06*    (2006.01)
*E05F 15/44*   (2015.01)
*B60J 7/057*   (2006.01)

(52) U.S. Cl.
CPC ........... *E05F 15/443* (2015.01); *B60J 7/0573* (2013.01); *B60J 7/06* (2013.01); *E05Y 2400/44* (2013.01)

(58) Field of Classification Search
CPC ... G01L 1/18; G01L 9/008; G01L 1/04; G01L 5/161; G01L 9/08; B60J 7/0573; B60J 7/06; E05F 15/443
See application file for complete search history.

(56) References Cited

U.S. PATENT DOCUMENTS

| | | | | |
|---|---|---|---|---|
| 3,710,050 A | * | 1/1973 | Richards | H01H 3/142 200/61.43 |
| 5,920,044 A | * | 7/1999 | Kaji | H01H 3/142 200/61.44 |
| 6,216,545 B1 | * | 4/2001 | Taylor | A61B 5/1036 73/862.046 |
| 6,834,740 B2 | * | 12/2004 | Kurttila | E05F 15/47 180/286 |

(Continued)

FOREIGN PATENT DOCUMENTS

| | | |
|---|---|---|
| DE | 102005028739 B3 | 6/2006 |
| DE | 102005058857 | 6/2007 |
| DE | 102005058857 B4 * | 10/2016 ............. E05F 15/42 |

OTHER PUBLICATIONS

European Search Report for corresponding European Patent Application No. 18206421.2, filed Nov. 15, 2018.

*Primary Examiner* — Thai T Dinh
(74) *Attorney, Agent, or Firm* — Steven M. Koehler; Westman, Champlin & Koehler, P.A.

(57) ABSTRACT

A sensor device for detecting a deformation of the sensor device, for example for use in a sunroof assembly, may be cost-effectively manufactured, while providing a high reliability. The sensor device includes a first electrically conductive metal lead; a first layer being a piezo-resistive material surrounding the first conductive lead; and a second electrically conductive metal lead. In a cross-section the second metal lead is arranged spaced apart from the first metal lead and the second metal lead is in electrical contact with the first layer.

20 Claims, 6 Drawing Sheets

(56) References Cited

U.S. PATENT DOCUMENTS

2011/0169513 A1\* 7/2011 Bolbocianu ........... E05F 15/443
                                                    324/705
2017/0040126 A1\* 2/2017 Takaba ................... H01H 3/142
2017/0234745 A1   8/2017 Choi \* cited by examiner

DEVICE FOR DETECTING AN IMPACT FORCE AND A METHOD OF MANUFACTURING THEREOF

BACKGROUND

The discussion below is merely provided for general background information and is not intended to be used as an aid in determining the scope of the claimed subject matter.

Aspects of the present invention pertain to a device for detecting an impact force, in particular for detecting an obstructing object in an opening of a sunroof of a vehicle and a method for manufacturing such a sensor device.

It is well known to have a vehicle with a sunroof arranged in its roof. The sunroof may comprise a transparent or translucent panel that may be fixed or moveable. A moveable panel may be tiltable and/or be slidable. In either embodiment of the moveable panel, an opening is provided in the roof such that an interior of the vehicle may come into open contact with the outside surroundings by opening the moveable panel. Thus, the moveable panel is provided as a closure member of the opening in the roof.

Objects may be arranged through the opening in the roof, purposefully or accidentally. However, when the closure member is moving, such objects may block the movement of the closure member or they may get trapped between the closure member and a frame of the sunroof. Moreover, human parts like fingers and arms may be put through the opening and eventually get trapped, potentially leading to injuries. On the other hand, hard objects getting trapped in the roof opening may lead to damage to the closure member or the mechanisms used to support and move the closure member.

It is known to provide a system to detect as soon as possible any object becoming trapped by the closure member such to stop or reverse the closure member as soon as possible in order to prevent injuries and damage. In particular, it is known to employ a pressure sensitive device arranged at a perimeter of the closure member and/or at an edge of the frame circumventing the opening in the roof. When an object becomes trapped, the object will impact on the pressure sensitive device. A control unit operatively coupled to the pressure sensitive device is thus enabled to detect the impact, determine that an object may be trapped and stop or reverse the closure member in order to prevent injury or damage.

Sensor devices for detecting the presence of a foreign object in the opening of a closure member such as a moveable panel of a sunroof assembly are well known. For example, a coaxial cable using a piezo-resistive layer is known. The piezo-resistive layer is a compressible layer having a relatively high electrical resistance in an uncompressed state and having a relatively low electrical resistance when compressed. Such piezo-resistive layer is commonly made by adding a relatively small amount of conductive particles in a compressible material with a relatively high electrical resistance such as an elastomer. In the uncompressed state, the conductive particles are spaced apart. When the piezo-resistive material is compressed, the conductive particles get closer to each other such that conductivity for an electrical current is improved.

The known sensor device comprises a first conductor at a central axis of the coaxial cable, a layer of piezo-resistive material around the first conductor and a second conductor arranged around the layer of piezo-resistive material. Applying a voltage over the first and second conductor will generate little to no electrical current, when the coaxial cable is not pressed. However, as soon as the cable is locally compressed by an external pressure, e.g. caused by the impact of a foreign object, a significantly larger electrical current will result. A relatively simple current measurement provides for a simple impact detection. In response to such detection, the control unit of the closure member may stop movement of the closure member or may reverse the movement of the closure member as above mentioned.

Although the known coaxial cable appears relatively simple, the cable is relatively expensive to manufacture. For example, the second conductor is known to be formed as a braiding of thin copper wires. Applying the braiding around the layer of the piezo-resistive material is however a complex and time-consuming process as the copper wires need to be braided around the pre-manufactured cable of the first conductor and the piezo-resistive layer. As a result, such a coaxial cable is not cost-effective. On the other hand, it is known to apply a highly conductive elastomer with a relatively large amount of conductive particles as a second conductor. However, for a reliable conductivity over a long length of the cable, the spread of the conductive particles in the elastomer needs to be controlled accurately during manufacturing, thereby increasing the costs. Further, reliability of such an embodiment of the coaxial cable over time may be limited due to aging of the materials and ease of breakage.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Generally, a cost-effective and reliable sensor device for use as an impact detection device at a perimeter of a moveable panel of a sunroof assembly is disclosed.

In a first aspect, the sensor device comprises a first electrically conductive metal lead having a first axis extending in a first direction; a first layer comprising a piezo-resistive material, wherein in a cross-section perpendicular to the first direction the piezo-resistive material is arranged surrounding the first conductive lead; and a second electrically conductive metal lead having a second axis extending substantially parallel to the first direction, wherein, in a cross-section perpendicular to the first direction, the second axis is arranged spaced apart from the first axis and wherein the second electrically conductive metal lead is in electrical contact with the first layer.

The sensor device provides for a cost-effectively manufacturable and reliable structure by providing an electrically conductive metal lead as the second conductor, which ensures a sufficient conductivity over the whole length of the sensor device and provides for reliability with respect to strength and durability.

In an embodiment, the second metal lead is arranged in the first layer. This provides for a simple structure that may be easily manufactured.

In another embodiment, the sensor device further comprises a second layer comprising an electrically conductive elastic material, the second layer being in electrical contact with the first layer, and wherein the second electrically conductive metal lead is arranged in the second layer. In this embodiment, the second metal lead is arranged in an additional conductive elastic layer. This conductive elastic layer may be arranged fully surrounding the first layer, but does not need to surround the first layer completely. The second layer is in electrical contact with the first layer such that upon compression of the sensor device an electrically conductive path is formed between the first metal lead and the second metal lead. Due to the local presence of the second metal lead, the requirements on the spread of conductive particles in the second layer is significantly alleviated, reducing manufacturing costs. For example, if at a specific location in the conductive second layer insufficient conductive particles are present, the second layer becomes piezo-resistive and will still function properly, when compressed.

Further, the conductive second layer may be used to increase a directional sensitivity of the sensor device. With a single second metal lead, the sensor device has a highest sensitivity in a direction along a line starting from the first metal lead and extending through the second metal lead. Providing the second metal lead in a conductive second layer increases an angle over which the sensor device has a high sensitivity, wherein the angle is defined by the first metal lead and two end points of the conductive second layer. If the second layer extends fully around the first layer, the angle of sensitivity becomes a full 360 degrees around the sensor device.

In another embodiment, the sensor device further comprises at least a third electrically conductive metal lead having a third axis extending substantially parallel to the first direction and wherein, in a cross-section perpendicular to the first direction, the third axis is arranged spaced apart from the first axis and from the second axis. In this embodiment, one or more additional metal leads are provided. These metal leads may be provided to further increase reliability or may be provided to increase the angle of sensitivity. In particular, if no second layer is applied, multiple metal leads may be used to improve the directionality of the sensitivity of the sensor device. For example, in a particular embodiment, three metal leads may be arranged over angles of 120 degrees or six metal leads may be arranged over angles of 60 degrees to provide for sufficient sensitivity over a full 360 degrees around the sensor device.

In a second aspect, the present invention provides an elastic seal for use between a closure member and an edge of a frame, which edge defines an opening in the frame, wherein the closure member is moveably arranged for opening and closing said opening. The elastic seal comprises the sensor device according to the present invention for detecting presence of an obstruction, like a foreign object, between the edge of the frame and the closure member. Since commonly there is an elastic seal member arranged at or near a perimeter of a closure member like a moveable panel, it is convenient and cost-effective to provide the sensor device in the elastic seal.

In an embodiment, the sensor device is embedded in an elastic material of the elastic seal. In particular, the sensor device may be embedded in the seal during manufacturing of the seal. In another embodiment, a recess may be provided in the elastic seal such that the sensor device may be arranged in such recess. Clamping and holding of the sensor device in the recess may be improved by providing a clip-like structure in the elastic seal, as well known in the art.

In a third aspect, the present invention provides a moveable panel assembly for mounting in a vehicle roof, wherein the moveable panel assembly comprises a closure member and a frame. The frame comprises an edge defining an opening in the frame and the closure member is moveably arranged for opening and closing said opening. At least one of a sensor device according to the present invention and an elastic seal according to the present invention is arranged between said edge and said closure member. In particular, the at least one of the sensor device and the elastic seal may be arranged at the edge of the frame forming the perimeter of the opening of may be arranged at or near a perimeter of the moveable panel. Thus, a foreign object forming an obstruction is reliably detectable before an injury or damage is caused.

In a fourth aspect, the present invention provides a vehicle comprising the moveable panel assembly.

In a fifth aspect, the present invention provides a method for manufacturing the sensor device. The method comprises the steps of
 a. providing a first electrically conductive metal lead having a first axis extending in a first direction;
 b. providing a second electrically conductive metal lead having a second axis;
 c. feeding at least the first metal lead into an extruder; and
 d. extruding a first layer around the first metal lead, the first layer comprising a piezo-resistive material.

The method further comprises arranging the second metal lead substantially parallel to the first direction, wherein in a cross-section perpendicular to the first direction the second axis is spaced apart from the first axis and the second metal lead is in electrical contact with the first layer. Thus, with a simple extrusion process, the sensor device is easily and cost-effectively manufactured. There is no need for a further costly process step of providing a braiding around the extrusion product nor needs the extrusion process to be controlled highly accurately to provide for sufficient and reliable conductivity of one or more of the extrusion layers.

In an embodiment of the method, step c comprises feeding the first metal lead and the second metal lead into the extruder and, in step d, the second metal lead is arranged in the first layer. Thus, in a simple and single manufacturing step the sensor device is cost-effectively manufactured.

In an embodiment of the method, the method further comprises the steps of
 e. feeding the first metal lead with the first layer, and the second metal lead into the extruder; and
 f. extruding a second layer in contact with the first layer, wherein the second metal lead is arranged in the second layer and wherein the second layer comprises an electrically conductive elastic material.

As an extruder may extrude multiple materials in a single extrusion step, also this embodiment may be easily and cost-effectively manufactured by a single manufacturing step.

In a sixth aspect, the present invention provides a method for manufacturing an elastic seal according to the present invention, wherein the method comprises the steps of
 g. providing a sensor device according to the present invention;
 h. feeding the sensor device into an extruder; and
 i. extruding the elastic seal having the sensor device embedded therein.

Thus, an elastic seal is easily and cost-effectively manufactured.

In a seventh aspect, the present invention provides a method for manufacturing an elastic seal according to the present invention, wherein the method comprises the steps of
 j. providing a first electrically conductive metal lead having a first axis extending in a first direction;

k. providing a second electrically conductive metal lead having a second axis;
l. providing a piezo-resistive material;
m. feeding the first and the second metal leads and the piezo-resistive material into an extruder; and
n. extruding the elastic seal such that
the second axis extends substantially parallel to the first direction;
in a cross-section perpendicular to the first direction, the piezo-resistive material is arranged surrounding the first metal lead;
in a cross-section perpendicular to the first direction, the second axis is arranged spaced apart from the first axis; and
the second electrically conductive metal lead is in electrical contact with the first layer.

Thus, in a simple and cost-effective manufacturing method the elastic seal in which the sensor device is embedded.

BRIEF DESCRIPTION OF THE DRAWINGS

Further scope of applicability of aspects of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended drawings, in which.

DETAILED DESCRIPTION OF THE ILLUSTRATIVE EMBODIMENTS

Aspects of the present invention will now be described with reference to the accompanying drawings, wherein the same reference numerals have been used to identify the same or similar elements throughout the several views.

Figure 1A:
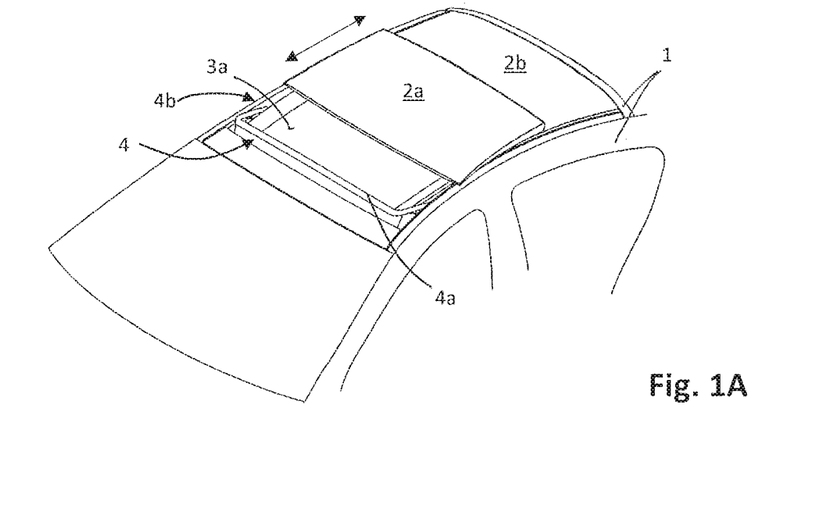
FIG. 1A shows a perspective view of a vehicle roof with a moveable panel assembly.

FIG. 1 illustrates a vehicle roof 1 having a moveable panel assembly arranged therein. The moveable panel assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
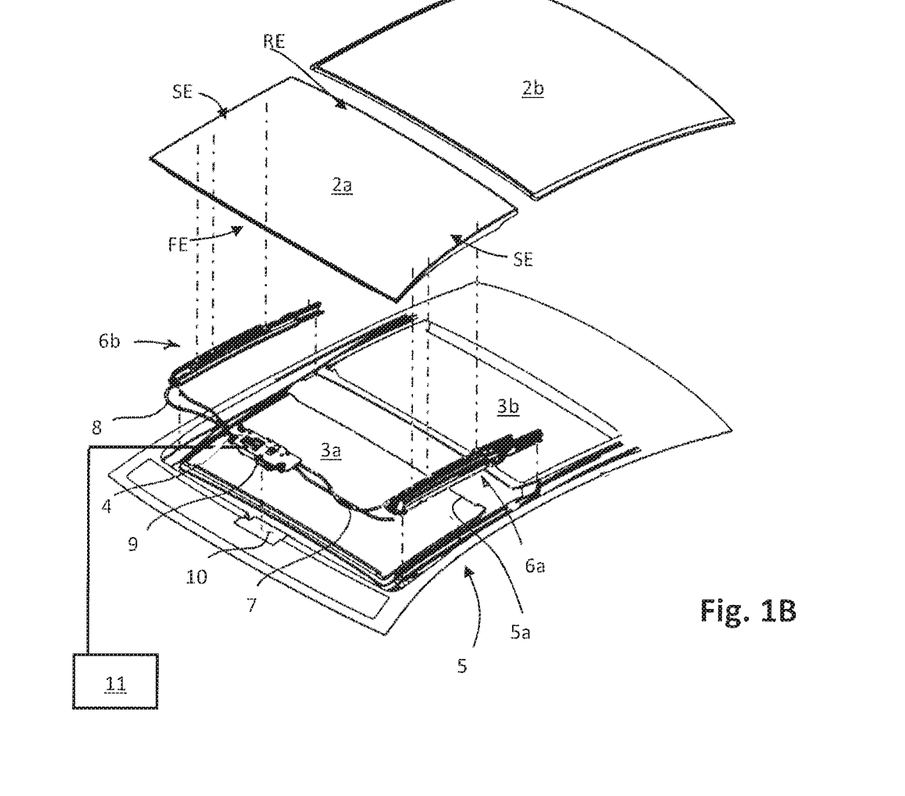
FIG. 1B shows an exploded view of the moveable panel assembly of FIG. 1A.

FIG. 1B illustrates the same vehicle roof as shown in FIG. 1A having panels 2a and 2b. Further, in this exploded view of FIG. 1B, it is shown that there is a second roof opening 3b. The first and second roof openings 3a, 3b are provided in a frame 5 of the moveable panel assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the moveable panel assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

During movement of the moveable panel 2a between the different positions, a foreign object may be arranged in a path of movement of the moveable roof panel 2a or any other moving part, e.g. one of the guides 6a, 6b. Such an object may for example be a finger or hand of a person, which may get hurt when trapped between the moveable panel 2a and the edge 5a of the frame 5 or the object may be any other thing extending through the roof opening 3a and which may potentially damage the moveable panel assembly. So both for safety of persons and for damage prevention, it is desired to detect the presence of an obstructing foreign object as soon as possible and to stop or reverse the moveable panel.

Figures 2A, 2B, 2C, 2D:
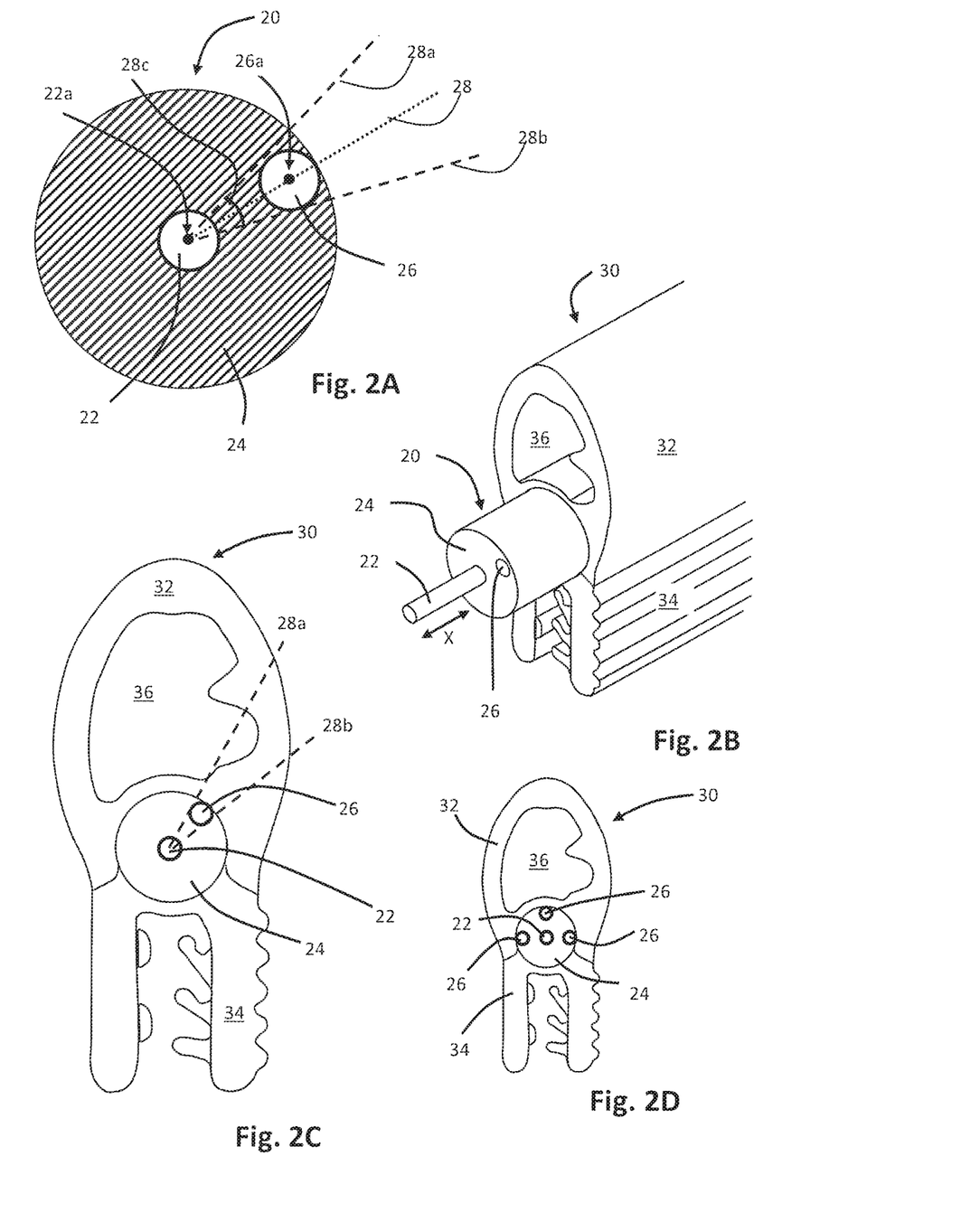
FIG. 2A shows a cross-sectional view of a first embodiment of a sensor device.
FIG. 2B shows a perspective view of a first embodiment of a seal incorporating the first embodiment of the sensor device according to FIG. 2A.
FIG. 2C shows a cross-sectional view of the first embodiment of the seal according to FIG. 2B.
FIG. 2D shows a cross-sectional view of a second embodiment of the seal.

In order to be able to detect an obstruction, a sensor device may be used, wherein the sensor device is configured to provide a signal as soon as the sensor device is deformed, in particular compressed due to an impact of an object. FIGS. 2A-2C illustrate a first embodiment of such a sensor device 20.

In FIG. 2A, a cross-sectional view of the first embodiment of the sensor device 20 is shown, wherein a first metal lead 22 comprises a first central axis 22a. In FIG. 2B, the sensor device 20 is illustrated as a part of a first embodiment of an elastic seal 30. As indicated in FIG. 2B, the first metal lead 22 and its first axis 22a (not indicated in FIG. 2B) extend in a first direction X. It is noted that, as used herein, the first metal lead and further metal leads extending in a direction means that the longest dimension of the respective metal leads extend in such direction.

In the cross-section perpendicular to the first direction X, which cross-section is shown in FIGS. 2A and 2C, the first metal lead 22 is surrounded by a first layer 24 comprising a piezo-resistive material. The piezo-resistive material may, for example, be an elastomer having dispersed therein a relatively small amount of conductive particles. A second metal lead 26 having a second central axis 26a is arranged in the piezo-resistive first layer 24. The second axis 26a is substantially parallel to and spaced apart from the first axis 22a.

The metal leads, such as the first and the second metal leads 22, 26 may be formed by solid wires, as illustrated, but may as well be formed by composed wires, wherein a bundle of relatively thin wires form a thicker wire, as well known in the art. In such embodiment, the axis of the metal lead, as used herein, means the axis of the bundle of wires.

As illustrated in FIG. 2B, the sensor device 20 may be arranged in the seal 30, wherein the illustrated embodiment of the seal 30 comprises a deformable, elastic portion 32 and a holding portion 34. The property of easy deformation may be designed by selection of a suitably elastic and deformable material and by suitable design of the deformable portion 32 e.g. by providing a hollow channel 36. The holding portion 34 may comprise two legs of a more rigid material and/or structure such that the seal 30 may be clamped on another part like an edge of a frame plate or an edge of a panel. The present invention is however not limited to any shape or structure or material of the elastic seal 30.

Returning to FIG. 2A, a virtual line 28 is illustrated extending from the first axis 22a through the second axis 26a. Compressing the sensor device 20 along the virtual line 28 results in a distance between the first metal lead 22 and the second metal lead 26 being decreased as the material of the first layer 24 is being compressed. As the first layer 24 exhibits piezo-resistive behaviour, an electrical resistance of a path between the first metal lead 22 and the second metal lead 26 through the first layer 24 is decreased due to the compression. As a result, an increase in electrical current may be detected, if a voltage is applied between the first metal lead 22 and the second metal lead 26. In an uncompressed state, little or even no current may flow between the first and the second metal leads 22, 26, while in the compressed state a significant electrical current may be induced. Hence, monitoring an electrical current and detecting a significant change in the current enables the desired detection of an impact by an object on the sensor device 20.

In the first embodiment of FIGS. 2A-2C, there are only two metal leads 22, 26 such that only a compression of the piezo-resistive layer 24 in a detection angle 28c may result in a significant change of the electrical resistance. The angle 28c extends between two outer border lines 28a, 28b, which are shown to be determined by the first axis 22a and a diameter of the second metal lead 26. It is presumed that a sensitivity is highest in the resulting detection angle 28c. However, the position of these outer border lines 28a, 28b may be selected differently depending on the desired or required sensitivity. For example, outside the detection angle 28c, but close to one of the outer border lines 28a, 28b a compression may still be detectable depending on an amount of compression. Hence, sensitivity may be expected to be lower, but detection may still be possible.

In FIG. 2D, another embodiment of the seal 30 is illustrated, wherein the sensor device is configured to have a larger angle, over which a high sensitivity is provided. Thereto, a third and fourth metal lead 26 are provided next to the second metal lead 26. The second, third and fourth metal leads 26 are connectable to the same polarity of a voltage, while the first metal lead 22 is connectable to the opposing polarity. Consequently, any compression of the sensor device resulting in any one of the second, third and fourth metal leads 26 will result in a detectable increase of an electrical current. Thus, the angle over which sufficient sensitivity is provided is easily increased by providing more metal leads in the first layer 24.

Figures 3A, 3B, 4A, 4B:
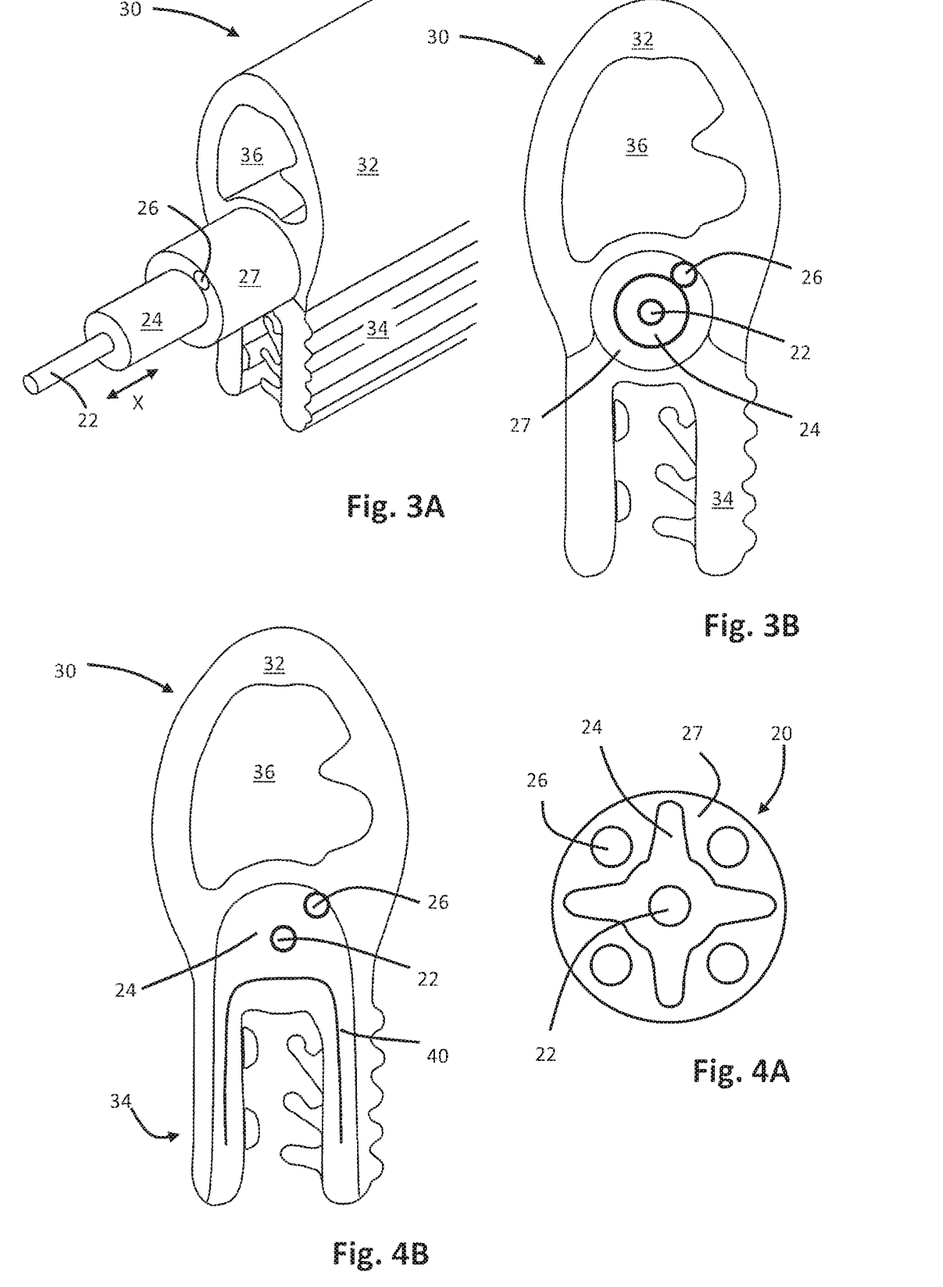
FIG. 3A shows a perspective view of a third embodiment of the seal.
FIG. 3B shows a cross-sectional view of the third embodiment of the seal according to FIG. 3A.
FIG. 4A shows a cross-sectional view of a second embodiment of the sensor device.
FIG. 4B shows a cross-sectional view of a fourth embodiment of the seal.

In a third embodiment, which is illustrated in FIGS. 3A and 3B, the detection angle is increased by use of second layer 27 of elastic, deformable material. The second layer 27 is electrically conductive. The second layer 27 may, for example, be formed from an elastomer in which a relatively large amount of conductive particles is dispersed. Due to the high conductivity of the second layer 27, the second layer 27 has the same voltage and polarity as the second metal lead 26. Compression at any position around the circumference of the second layer 27 will increase an electrical current flowing between the second metal lead 26 and the first metal lead 22. Consequently, a 360-degrees detection angle is provided.

As discussed hereinabove, the dispersion of the conductive particles in the material of the second layer 27 may not be very even, allowing a simple and cost-effective manufacturing. The presence of the second metal lead 26 thus ensures that an applied voltage will be applied over the whole length without being dependent on the local spread of conductive particles. While an uneven distribution of conductive particles may result in a deterioration of the conductivity over the length of the sensor device preventing stable and reliable operation, such uneven distribution is expected not to affect the detection sensitivity. Obstructing objects may be expected to have an impact size larger than a local void of conductive particles due to which the obstruction by the object will still be detected.

In the embodiments illustrated in FIGS. 2A-3B, the first and the second layers 24, 27 are illustrated as coaxial layers with the first metal lead 22 arranged in the centre. The present invention is however not limited to such arrangement. For example, in a second embodiment of the sensor device 20 as illustrated in FIG. 4A, the first layer 24 is provided in a star-like cross-sectional shape, wherein the second metal leads 26 (in this embodiment four metal leads) are arranged in recesses between arms of the star-like shape of the first layer 24. This embodiment may be advantageous during manufacturing. In particular, the first metal lead 22 and the first layer 24 may be formed in a first extrusion step. Then, the four metal leads 26 may be arranged between the arms and in a second extrusion step the second layer 27 may be applied to fixate the four metal leads 26. As the four metal leads 26 are kept in place during the second extrusion step, more freedom for selection of a material for the second layer 27 is provided. For example, with certain materials, the metal leads 26 may start floating in the liquefied material during extrusion due to which the position of the metal leads 26 may not be ensured. With the star-like shape of the first layer 24, such materials may be selected for the second layer 27.

In the embodiments illustrated in FIGS. 2A-4A, the sensor device 20 is illustrated as a cable-like element having a circular cross-section. The present invention is however not limited to such shape of the sensor device. For example, in a fourth embodiment of the seal 30 as shown in FIG. 4B, the piezo-resistive first layer 24 is an integral part of the holding portion 34 of the elastic seal 30. The metal leads 22, 26 are arranged in the first layer 24. To prevent electrical conduction to an object contacting the seal 30, the piezo-electric first layer 24 is covered by a sufficiently isolating material that is also used for the deformable portion 32. If the piezo-resistive material of the first layer 24 is not rigid and stiff enough for clamping, a clamping spring 40 may be arranged in the holding portion 34.

Figure 5:
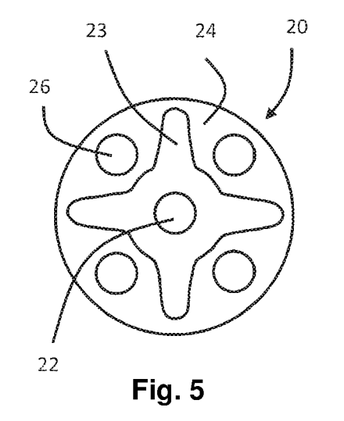
FIG. 5 shows a cross-sectional view of a third embodiment of the sensor device.

FIG. 5 illustrates a third embodiment of the sensor device 20. Although the cross-section as shown in FIG. 5 appears similar to the cross-section of the second embodiment shown in FIG. 4A, the third embodiment differs from the second embodiment in that the first metal lead 22 is embedded in a conductive layer 23 having the star-like cross-sectional shape.

In this third embodiment, the four metal leads 26 are kept in place during extrusion, like in the second embodiment. In operation, each of the four metal leads 26 may be pressed in virtually any direction as they each will be pressed towards the conductive layer 23. Reducing the distance between the metal lead 26 and the conductive layer 23 will reduce the resistance of a path between the first metal lead 22 and the second metal lead 26 through the first layer 24 and the conductive layer 23 and thus will result in a detectable change in electrical current.

Figure 6:
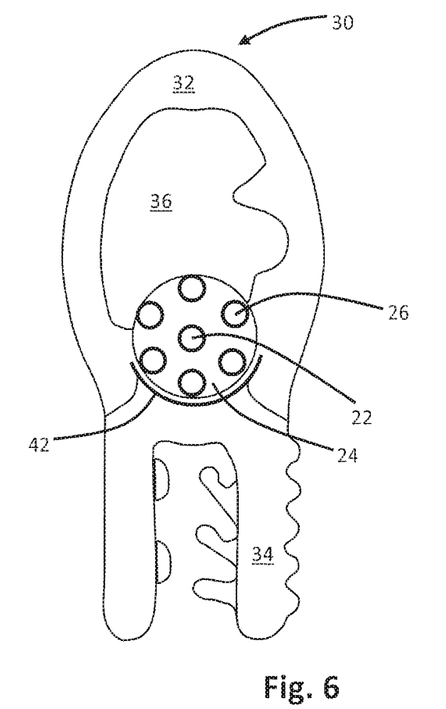
FIG. 6 shows a cross-sectional view of a fifth embodiment of the seal.

FIG. 6 shows the fifth embodiment of the seal, wherein the sensor device 20 may be manufactured separate from the seal 30. In the illustrated embodiment, the seal 30 is provided with a recess formed in the deformable portion 32 and a clamping spring 42 is provided next to the recess. The sensor device 20 may be introduced through the hollow channel 36 and be pressed into the recess and the corresponding clamping spring 42. This embodiment may, for example, be advantageous if the sensor device 20 is not used over the full length of the seal 30. So, at predetermined positions, the sensor device 20 may be provided, while at other locations, the sensor device 20 may be omitted.

Figure 7A:
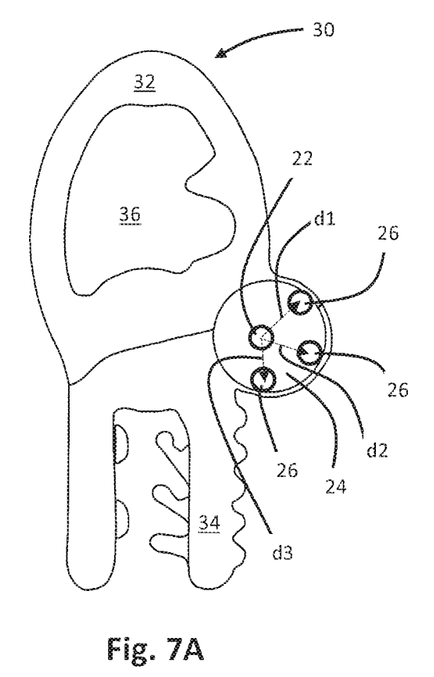
FIG. 7A shows a cross-sectional view of a sixth embodiment of the seal.

FIG. 7A shows another embodiment of the seal 30, wherein the sensor device is not arranged in a centre position of the seal 30. In this embodiment, the sensor device 20 is arranged in a protruding side portion of the deformable portion 32. This provides a higher sensitivity on one side of the seal 30 as compared to the opposing side of the seal 30. This embodiment may therefore be advantageous in an application where a direction of the sensitivity is relevant.

Such directionality may be further designed by a suitable design of the sensor device 20.

As illustrated, the sensor device 20 is provided with the first metal lead 22 and three metal leads 26 as second metal leads opposing the first metal lead 22. A first one of the three metal leads 26 is arranged at a distance d1, a second one is arranged at a distance d2 and a third one is arranged at a distance d3. The distances d1, d2, d3 are not equal and specifically selected. For example, since the third metal lead 26 (the one at distance d3) is arranged close to the holding portion, compression of the sensor device 20 may be more difficult compared to the first one of the metal leads 26 (the one at distance d1). To compensate for its position relative to the holding portion 34, the third one of the metal leads 26 is arranged closer to the first metal lead 22 such that a relatively small impact will provide for a sufficient compression to detect a significant current change.

On the other hand, the relative position of the first metal lead 22 and the second metal lead 26 needs to be considered and designed taking into account other electrical properties as well. For example, an electrical capacitance formed by the first and second metal leads 22, 26 may need to be considered, depending on the application.

Figure 7B:
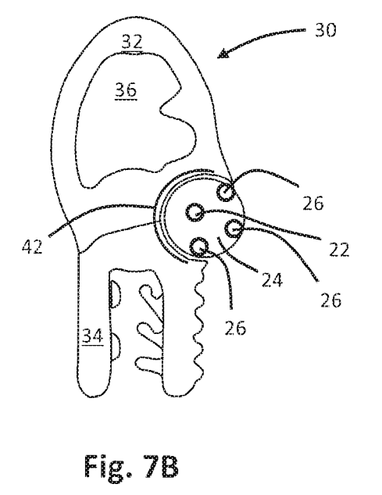
FIG. 7B shows a cross-sectional view of a seventh embodiment of the seal.

FIG. 7B illustrates an embodiment of the seal 30 having the sensor device 20 at one of the sides similar to the embodiment of FIG. 7A. The embodiments of FIGS. 7A and 7B differ in the fact that in the embodiment of FIG. 7B the sensor device 20 is arranged in a recess with a clamping spring 42 similar to the embodiment of FIG. 6. In this embodiment, the sensor device 20 may be easily pressed into the recess without first having to arranged the sensor device 20 in the hollow channel 36. Since this embodiment is directed at an application with high sensitivity at only one side of the seal 30, the clamping spring 42 does not negatively affect the sensitivity.

Figure 8:
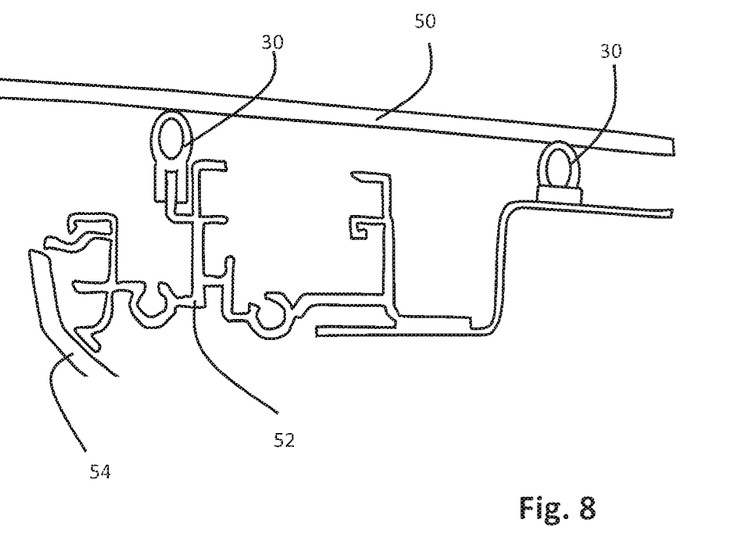
FIG. 8 shows a cross-sectional view of a part of an embodiment of a moveable panel assembly.

FIG. 8 shows a cross-section of a part of a frame of a moveable panel assembly. In particular, the cross-section of FIG. 8 corresponds to a side edge (cf. side edge SE of FIG. 1B). A number of parts is however omitted for sake of clarity.

More in detail, FIG. 8 shows a frame part 52 for mounting different elements. For example, a cover plate 54 may be mounted on the frame part 52. Likewise, functional parts may as well be mounted on the frame part 52. As illustrated, the frame part 52 may support two seals 30. One of the seals 30 is arranged on an interior side IS of the frame part 52 for covering and protecting against noise, for example. A second one of the seals 30 may be arranged at an exterior side ES of the frame part 52 to prevent water and dirt from the outside entering. As mentioned above, both seals 30 are provided with a sensor device. In another embodiment, however, only one of the seals 30 may be provided with the sensor device.

Figure 9:
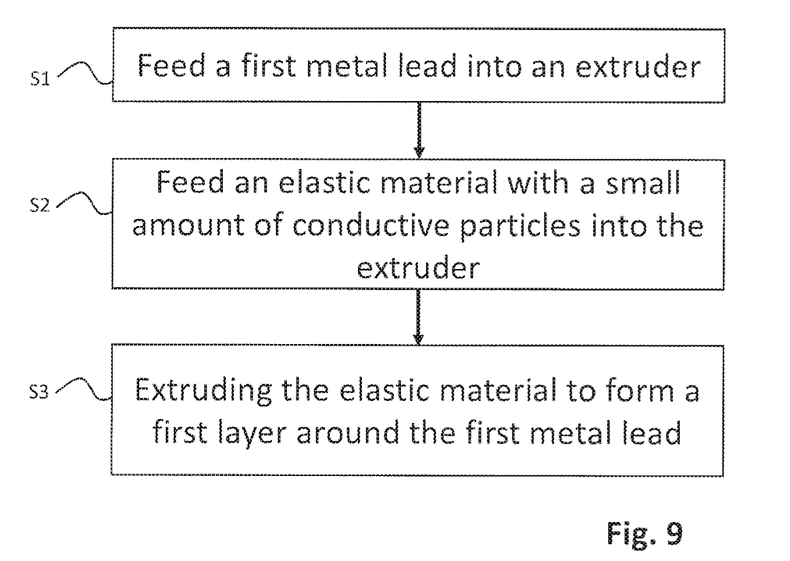
FIG. 9 shows a flow diagram for illustrating a first embodiment of a method of manufacturing.

In FIG. 9, a method of manufacturing the sensor device or for manufacturing a seal is illustrated. As described in more detail hereinafter, both the sensor device and the elastic seal may be manufactured by extrusion. Some embodiments may be manufactured by a single extrusion step; other embodiments may be formed by multiple extrusion steps. Irrespective of the number of extrusion steps required, the manufacturing steps for manufacturing the sensor device or the for manufacturing the elastic seal are not essentially different and a same sequence of manufacturing steps may lead to either.

In a first manufacturing step S1, a first metal lead is fed into an extruder. As mentioned above, the first metal lead may be a solid wire, e.g. a copper wire, or may be a composed wire. Further in a second step S2, an elastic material suited for extrusion is provided with a relatively low amount of conductive particles to form a piezo-resistive material after extrusion. In a third manufacturing step S3, the elastic material is extruded to form a first layer of piezo-resistive material around the first metal lead.

In an embodiment, in the first step S1, a second metal lead may be fed as well. With simultaneously feeding the first and the second metal leads and controlling the relative positions of the metal leads, the sensor device according to FIG. 2A may be manufactured in a single extrusion step.

Figure 10:
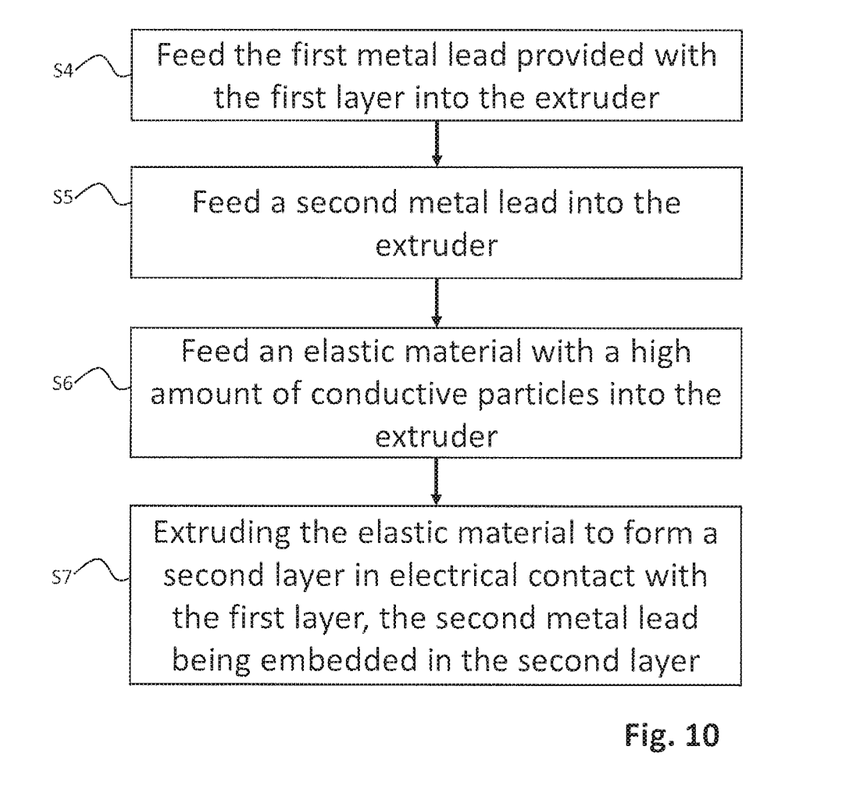
FIG. 10 shows a flow diagram for illustrating a second embodiment of a method of manufacturing.

In another embodiment, as illustrated in FIG. 10, the result of the third manufacturing step S3 may be fed back into the extruder in a fourth manufacturing step S4. In such embodiment, the second metal lead (S5) and an elastic material with a relatively large amount of conductive particles (S6) may be fed into the extruder to form a second layer of a conductive elastic material may be formed in a seventh manufacturing step S7. The second layer is formed in electrical contact with the first piezo-resistive layer and the second metal lead is embedded in the second layer to be in electrical contact with the first layer as well.

For extrusion of the sensor device and/or the elastic seal, many elastic materials are known in the art. Suitable materials include, but are not limited to TPE, SEBS, TPV, silicone and EPDM. Further, for their electrical properties, conductive carbon particles may be provided in these materials. These and other materials may be selected by the skilled person taking into account the well-known properties of the materials and the desired properties of the sensor device and/or seal.

The shape of the result of the extrusion steps is easily selected by selection of a suitable die to be used in the extrusion step. Therefore, depending on the selected embodiment, it may not be required to first manufacture a sensor device with a cable-like shape. It may be cost-effective to design an elastic seal that may embed the metal leads and the piezo-resistive layer in such arrangement that the elastic seal may be manufactured with as few as possible manufacturing steps, preferably in a single extrusion step. Extruding of cables, wires and seals is as such well known in the art and based on the above description of the sensor device and seal, the person skilled in the art will be enabled to perform suitable extrusion steps. Therefore, further elucidation of the manufacturing steps is omitted herein.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

The invention claimed is:

1. A sensor device for detecting a deformation of the sensor device, the sensor device comprising:
    a first electrically conductive metal lead having a first axis extending in a first direction;
    a first layer comprising a piezo-resistive material, wherein in a cross-section perpendicular to the first direction the piezo-resistive material is arranged surrounding the first conductive lead; and
    a second electrically conductive metal lead having a second axis extending substantially parallel to the first direction, wherein, in a cross-section perpendicular to the first direction, the second axis is arranged spaced apart from the first axis and wherein the second electrically conductive metal lead is in electrical contact with the first layer.

2. The sensor device according to claim 1, wherein the second metal lead is arranged in the first layer.

3. The sensor device according to claim 1, wherein the sensor device further comprises a second layer comprising an electrically conductive elastic material, the second layer being in electrical contact with the first layer, and wherein the second electrically conductive metal lead is arranged in the second layer.

4. The sensor device according to claim 1, wherein the sensor device further comprises at least a third electrically conductive metal lead having a third axis extending substantially parallel to the first direction and wherein, in a cross-section perpendicular to the first direction, the third axis is arranged spaced apart from the first axis and from the second axis.

5. The sensor device according to claim 1, wherein the sensor device is configured as an elastic seal for use between a closure member and an edge of a frame, the edge defining an opening in the frame, wherein the closure member is moveably arranged for opening and closing said opening, and wherein the sensor device is configured to detect presence of an obstruction between the edge of the frame and the closure member.

6. The sensor device according to claim 5, wherein the a first electrically conductive metal lead, the first layer comprising a piezo-resistive material and the second electrically conductive metal lead, are embedded in an elastic material of the elastic seal.

7. A moveable panel assembly for mounting in a vehicle roof, the moveable panel assembly comprising:
    a closure member and a frame, wherein the frame comprises an edge defining an opening in the frame and wherein the closure member is moveably arranged for opening and closing said opening; and
    a sensor device arranged between said edge and said closure member, wherein
    the sensor device comprises:
        a first electrically conductive metal lead having a first axis extending in a first direction;
        a first layer comprising a piezo-resistive material, wherein in a cross-section perpendicular to the first direction the piezo-resistive material is arranged surrounding the first conductive lead; and
        a second electrically conductive metal lead having a second axis extending substantially parallel to the first direction, wherein, in a cross-section perpendicular to the first direction, the second axis is arranged spaced apart from the first axis and wherein the second electrically conductive metal lead is in electrical contact with the first layer.

8. The moveable panel assembly according to claim 7, wherein the sensor device is arranged at the edge of the frame.

9. The moveable panel assembly according to claim 7, wherein the sensor device is arranged at the closure member.

10. The moveable panel assembly according to claim 7 and a vehicle having the vehicle roof.

11. The movable panel assembly of claim 7 and further comprising an elastic seal arranged between said edge and said closure member.

12. The movable panel assembly of claim 11 wherein the sensor device is joined to or within the elastic seal.

13. The moveable panel assembly according to claim 12, wherein the sensor device and elastic seal is arranged on the edge of the frame.

14. The moveable panel assembly according to claim 12, wherein the sensor device and elastic seal is arranged on the closure member.

15. The moveable panel assembly according to claim 12 and a vehicle having the vehicle roof.

16. A method for manufacturing a sensor device, the method comprising:
    providing a first electrically conductive metal lead having a first axis extending in a first direction;
    providing a second electrically conductive metal lead having a second axis;
    feeding at least the first metal lead into an extruder;
    extruding a first layer around the first metal lead, the first layer comprising a piezo-resistive material; and
    arranging the second metal lead substantially parallel to the first direction, wherein in a cross-section perpendicular to the first direction the second axis is spaced apart from the first axis and the second metal lead is in electrical contact with the first layer.

17. The method according to claim 16, wherein feeding at least the first metal lead into the extruder comprises feeding the first metal lead and the second metal lead into the extruder and wherein arranging the second metal lead comprises the second metal lead being arranged in the first layer.

18. The method according to claim 16, wherein the method further comprises:
    feeding the first metal lead provided with the first layer into the extruder and feeding the second metal lead into the extruder; and
    extruding a second layer in electrical contact with the first layer, wherein the second metal lead is arranged in the second layer and wherein the second layer comprises an electrically conductive elastic material.

19. The method of claim 16, wherein extruding comprises manufacturing an elastic seal for use between a closure member and an edge of a frame, the edge defining an opening in the frame, wherein the closure member is moveably arranged for opening and closing said opening, and wherein the sensor device is configured to detect presence of an obstruction between the edge of the frame and the closure member.

20. The method of claim 16, wherein arranging comprises extruding an elastic seal.

* * * * *